United States Patent
Yamaguchi et al.

(10) Patent No.: US 11,630,643 B2
(45) Date of Patent: Apr. 18, 2023

(54) SPECIFICATION DOCUMENT CREATION SYSTEM AND NON-TRANSITORY COMPUTER-READABLE RECORDING MEDIUM

(71) Applicant: FUJITSU LIMITED, Kawasaki (JP)

(72) Inventors: Hirobumi Yamaguchi, Kawasaki (JP); Fumiya Arikuni, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 17/700,572

(22) Filed: Mar. 22, 2022

(65) Prior Publication Data

US 2023/0023549 A1    Jan. 26, 2023

(30) Foreign Application Priority Data

Jul. 26, 2021    (JP) .............. JP2021-121224

(51) Int. Cl.
- *G06F 9/44* (2018.01)
- *G06F 8/30* (2018.01)
- *G06F 9/4401* (2018.01)
- *G06F 3/147* (2006.01)

(52) U.S. Cl.
CPC .............. *G06F 8/311* (2013.01); *G06F 3/147* (2013.01); *G06F 9/4401* (2013.01)

(58) Field of Classification Search
CPC ....................................................... G06F 9/44
See application file for complete search history.

(56) References Cited

U.S. PATENT DOCUMENTS

| | | | |
|---|---|---|---|
| 9,244,510 B1* | 1/2016 | Conrad | G06F 11/30 |
| 2005/0166142 A1* | 7/2005 | Mise | G06Q 30/08 |
| | | | 715/255 |
| 2008/0209202 A1 | 8/2008 | Kawahara | |
| 2012/0169754 A1* | 7/2012 | Pesonen | H04B 5/0031 |
| | | | 345/582 |
| 2022/0357960 A1* | 11/2022 | Chou | G06Q 20/202 |

FOREIGN PATENT DOCUMENTS

| | | |
|---|---|---|
| JP | 2008-204395 A | 9/2008 |
| JP | 2009-271864 A | 11/2009 |

* cited by examiner

*Primary Examiner* — Jae U Jeon
(74) *Attorney, Agent, or Firm* — Fujitsu Patent Center

(57) ABSTRACT

Provided is a specification document creation system including a first computer and a second computer, wherein the first computer is configured to generate, based on configuration information, display data for displaying a first display item, which is determined by the configuration information, of a BIOS on a display device, the configuration information indicating a hardware configuration of the first computer, and analyze the display data to generate first information including the first display item included in the display data, and the second computer is configured to analyze a source code of the BIOS to generate second information including a second display item, which is determined independently of the hardware configuration of the first computer, of the BIOS, and create a specification document for the BIOS in which the first display item included in the first information and the second display item included in the second information are described.

4 Claims, 21 Drawing Sheets

FIG. 2A

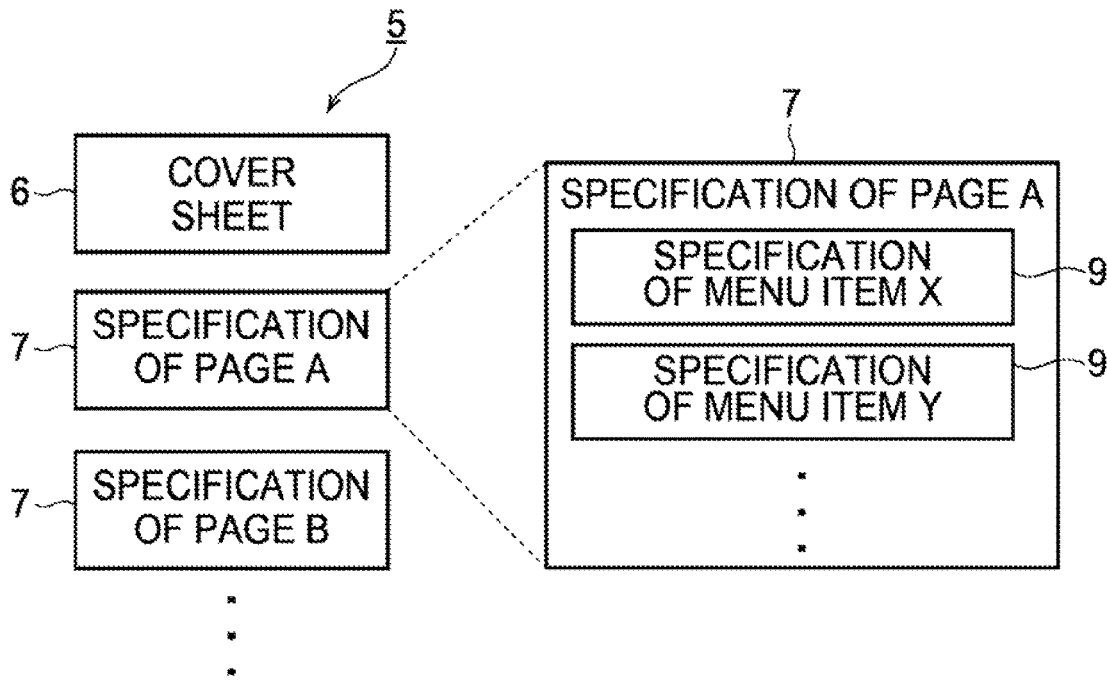

FIG. 2B

1. PAGE NAME
2. MENU ITEM NAME
3. HELP MESSAGE FOR MENU ITEM
4. OPTIONS OF MENU ITEM
   (a) TYPE OF SELECTION SYSTEM (DROP-DOWN LIST
      (SELECTION TYPE) OR DIRECT INPUT TYPE)
   (b) SELECTABLE OPTIONS
   (c) DEFAULT VALUE
5. CONDITION FOR DISPLAYING MENU ITEM
   (a) CONDITION OF MODEL FOR DISPLAYING
   (b) CONDITION OF CONFIGURATION FOR DISPLAYING
   (c) CONDITION DEPENDING ON OTHER MENU ITEMS
   (d) DISPLAY MANNER (NORMAL DISPLAY, GRAY-OUT DISPLAY,
      NON-DISPLAY, OR THE LIKE)
6. OPERATION PRIVILEGE OF MENU ITEM (WHETHER
   ADMINISTRATOR CAN CHANGE MENU ITEM,
   OR WHETHER USE CANR CHANGE MENU ITEM, OR THE LIKE)
7. OTHER (NOT LIMITED TO ABOVE ITEMS,
   RELATING TO ATTRIBUTION OF MENU)

FIG. 3

| | | MENU ITEM NAME | SELECTABLE OPTIONS | HELP MESSAGE | OPERATION PRIVILEGE | DEFAULT VALUE IN EACH MODEL | CONDITION FOR DISPLAY |
|---|---|---|---|---|---|---|---|
| 9 | 13. | Boot Watchlog | Enabled / Disabled | If 'Enabled', the selected 'Action' will occur after the specified timeout, if the O/S boot fails (no connect to ServerView agents). | ADMIN | Model_A: Disabled<br>Model_B: Disabled | SET WHETHER TO RESTART SYSTEM WHEN SERVER MANAGEMENT SOFTWARE (ServerView Agent) CANNOT ESTABLISH CONNECTION WITH iRMC |
| 9 | 14. | Timeout Value | 1..100 | Boot Watchlog timeout value in minutes. The range is 1 to 100 minutes. | ADMIN | Model_A: 100<br>Model_B: 100 | GRY: WHEN "Boot Watchlog" IS Disabled<br>REBOOT SYSTEM WHEN "Boot Watchlog" IS Enabled |

FIG. 7

```
formset
  guid = PAGE1_FORMSET_GUID,
  title = STRING_TOKEN (STR_FORM_SET_TITLE_PAGE1), varstore VARSTORE1,
    varid = VARSTORE1_ID,
    name = VarStoreData, form formid = FORM1_ID,
    title = STRING_TOKEN (STR_FORM1_TITLE);

#if (MODEL == MODEL_A) || (MODEL == MODEL_C)
    oneof name = form1_item1_oneof,
      varid = VarStoreData.form1_item1,
      prompt = STRING_TOKEN(STR_MENU_ITEM1_PROMPT)
      help  = STRING_TOKEN(STR_MENU_ITEM1_HELP)
      option text = STRING_TOKEN (STR_ITEM1_TEXT1), value = 0x1, flags = DEFAULT;
      option text = STRING_TOKEN (STR_ITEM1_TEXT2), value = 0x2, flags = 0;
    endoneof;
  #endif label DYNAMIC_PAGE1_START;
  label DYNAMIC_PAGE1_END;

goto
    formsetguid = PAGE2_FORMSET_GUID,
    formid = FORM2_ID,
    prompt = STRING_TOKEN (STR_GOTO_PAGE2);
```

```
<system_config>
  <system_config_id>100</system_config_id>
  <cpu_config>
    <cpu_count>2</cpu_count>
    <cpu_type>typeA</cpu_type>
    <cpu_cores>64</cpu_cores>
    (OMISSION)
  </cpu_config>
  <memory_config>
    <memory_count>16</memory_count>
    <memory_info>
     <memory_type>DDR4</memory_type>
     <memory_size>32GB</memory_size>
    </memory_info>
    <memory_info>
     (OMISSION)
    </memory_info>
    (OMISSION)
  </memory_config>

(REST IS OMITTED)
</system_config>
```
... 24

```xml
<?xml version="1.0"?>
<xsd:schema xmlns:xsd="http://www.w3.org/2001/XMLSchema">
<xsd:element name="menu_page">
  <xsd:complexType>
    <xsd:sequence>
      <xsd:element name="formsetguid" type="xsd:string" />
      <xsd:element name="formsetvariantid" type="xsd:string" />
      <xsd:element ref="item" minOccurs="0" maxOccurs="unbounded"/>
      <xsd:element ref="next_page" minOccurs="0" maxOccurs="unbounded" />
      <xsd:element ref="dynamic_item" minOccurs="0" maxOccurs="unbounded"/>
    </xsd:sequence>
  </xsd:complexType>
</xsd:element>

<xsd:element name="item">
  <xsd:complexType>
    <xsd:sequence>
      <xsd:element name="item_name" type="xsd:string" />
      <xsd:element name="item_type" type="xsd:string" />   33a
      <xsd:element name="suppress_condition" type="xsd:string" minOccurs="0" maxOccurs="unbounded" />
      <xsd:element name="grayout_condition" type="xsd:string" minOccurs="0" maxOccurs="unbounded" />
      <xsd:element ref="item_option" minOccurs="0" maxOccurs="unbounded" />
      (REST IS OMITTED)
    </xsd:sequence>
  </xsd:complexType>
</xsd:element>

(REST IS OMITTED)

</xsd:schema>
```

```
<?xml version="1.0"?>
<xsd:schema xmlns:xsd="http://www.w3.org/2001/XMLSchema">
  <xsd:element name="menu_page">
    <xsd:complexType>
      <xsd:sequence>
        <xsd:element name="formsetguid" type="xsd:string" />
        <xsd:element name="formsetvariantid" type="xsd:string" />
        <xsd:element ref="item" minOccurs="0" maxOccurs="unbounded"/>
        <xsd:element ref="next_page" minOccurs="0" maxOccurs="unbounded"/>
        <xsd:element ref="dynamic_item" minOccurs="0" maxOccurs="unbounded"/>
      </xsd:sequence>
    </xsd:complexType>
  </xsd:element>

<xsd:element name="item">
    <xsd:complexType>
      <xsd:sequence>
        <xsd:element name="item_name" type="xsd:string" />   35a
        <xsd:element name="item_type" type="xsd:string" />
        <xsd:element name="suppress_condition" type="xsd:string" minOccurs="0" maxOccurs="unbounded" />
        <xsd:element name="grayout_condition" type="xsd:string" minOccurs="0" maxOccurs="unbounded" />
        <xsd:element ref="item_option" minOccurs="0" maxOccurs="unbounded" />
        (REST IS OMITTED)
      </xsd:sequence>
    </xsd:complexType>
  </xsd:element>

(REST IS OMITTED)

</xsd:schema>
```

| item name | Active Processor Cores | |
|---|---|---|
| help | Select number of active cores | 35a |
| supress condition | MODEL_B | |
| option type | drop-down list | |
| option value | All | |
| option value | 1 | |
| option value | 2 | cpu_type=typeA or typeB |
| option value | 3 | cpu_type=typeA |

| | 71 | |
|---|---|---|
| entry_id | 1 | |
| entry_type | item | |
| item_name | "Active Processor Cores" | |
| item_help | "Select number of active cores" | 35a |
| formid | "1001" | |
| formsetvariant id | "2" | |
| systemconfig_id | "100" | |
| option_type | oneof | |
| num_of_oneof_options | "4" | |
| option | "All" | |
| option | "1" | 33a |
| option | "2" | |
| option | "3" | |
| suppress_condition | "model=MODEL_B" | |
| grayout_condition | "" | |
| config_condition | "cpu_type=typeA" | |

FIG. 18B

| | 71 | |
|---|---|---|
| entry_id | 2 | |
| entry_type | item | |
| item_name | "Active Processor Cores" | |
| item_help | "Select number of active cores" | 35a |
| formid | "1001" | |
| formsetvariant id | "3" | |
| systemconfig_id | "101" | |
| option_type | oneof | |
| num_of_oneof_options | "4" | |
| option | "All" | |
| option | "1" | 33a |
| option | "2" | |
| suppress_condition | "model=MODEL_B" | |
| grayout_condition | "" | |
| config_condition | "cpu_type=typeB" | |

FIG. 19

| entry_id | 1 |
|---|---|
| entry_type | merged_item |
| item_name | "Active Processor Cores" |
| item_help | "Select number of active cores" |
| formid | "1001" |
| formsetvariant_id | "2, 3" |
| systemconfig_id | "100, 101" |
| option_type | oneof |
| num_of_oneof_options | "3-4" |
| option | "All" |
| option | "1" |
| option | "2" |
| option | "3" |
| suppress_condition | "model=MODEL_B" |
| grayout_condition | "" |
| config_condition | "child_entry_id=101, 102, 103, 104" |
| | |
| entry_id | 101 |
| entry_type | option_condition |
| parent_entry_id | 1 |
| option | "3" |
| config_condition | "cpu_type=typeA" |
| | |
| entry_id | 102 |
| entry_type | option_condition |
| parent_entry_id | 1 |
| option | "2" |
| config_condition | "cpu_type=typeA or typeB" |

72a ⋯ (rows for entry_id 101)
72b ⋯ (rows for entry_id 102)

FIG. 20

```
<!doctype html public "-//w3c//dtd html 4.0 transitional//en">
<html>
<head>
<meta http-equiv="Content-Type" content="text/html;charset=utf-8">
</head>
<body>
<div id="page">
<div id="page_title"> Processor Configuration </div>
<div id="item">
<table border="1">
<tbody>
<tr>
<td> item name </td>
<td> Active Processor Cores</td>
</tr>
<tr>
<td> help </td>
<td> Select number of active cores </td>
</tr>
<tr>
<td> suppress condition </td>
<td> MODEL_B </td>
</tr>
<tr>
<td> option type </td>
<td> drop-down list</td>
</tr>
<tr>
<td> option value </td>
<td> All </td>
<td> </td>
</tr>
<tr>
<td> option value </td>
<td> 1 </td>
<td> </td>
</tr>
<tr>
<td> option value </td>
<td> 2 </td>
<td> cpu_type=typeA or typeB </td>
</tr>
<tr>
<td> option value </td>
<td> 3 </td>
<td> cpu_type=typeA </td>
</tr>
</tbody>
</table>
</div>
</div>
</body>
</html>
```

SPECIFICATION DOCUMENT CREATION SYSTEM AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2021-121224, filed on Jul. 26, 2021, the entire contents of which are incorporated herein by reference.

FIELD

A certain aspect of embodiments described herein relates to a specification document creation system and a non-transitory computer-readable recording medium.

BACKGROUND

When a computer is powered on, a basic input/output system (BIOS) is executed before the operating system (OS) is started. The BIOS is a firmware that initializes hardware such as a central processing unit (CPU) at the time of starting the computer, and is stored in a nonvolatile memory.

The BIOS displays a BIOS menu for allowing the user to change the configuration of the computer. Examples of the configuration that can be changed through the BIOS menu include the number of cores of the CPU.

A computer developer develops a BIOS on the basis of the specification document for the BIOS menu created in advance. The specification document describes pages to be displayed on the display and items included in each page, for example. In addition, the specification document for the BIOS menu is created manually by the developer while the computer is started and stopped repeatedly.

However, if the computer is started and stopped repeatedly in this manner, it will take a long time to create the specification document for the BIOS menu. Note that the technique related to the present disclosure is also disclosed in Japanese Laid-Open Patent Publication Nos. 2008-204395 and 2009-271864.

SUMMARY

According to an aspect of the embodiments, there is provided a specification document creation system including a first computer and a second computer, wherein the first computer is configured to: generate, based on configuration information, display data for displaying a first display item, which is determined by the configuration information, of a BIOS on a display device, the configuration information indicating a hardware configuration of the first computer, and analyze the display data to generate first information including the first display item included in the display data, and the second computer is configured to: analyze a source code of the BIOS to generate second information including a second display item, which is determined independently of the hardware configuration of the first computer, of the BIOS, and create a specification document for the BIOS in which the first display item included in the first information and the second display item included in the second information are described.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2A schematically illustrates a specification document for the BIOS menu, and FIG. 2B schematically illustrates items included in the specification of a page.

FIG. 3 schematically illustrates the specification of each of menu items "Boot Watchlog" and "Timeout Value".

FIG. 7 schematically illustrates a VFR code.

FIG. 9 schematically illustrates configuration information contained in a configuration file.

FIG. 11 schematically illustrates first analysis information.

FIG. 14 schematically illustrates second analysis information.

FIG. 15 schematically illustrates a specification document created by a specification document creation unit.

FIG. 18A schematically illustrates a menu item table, and FIG. 18B illustrates a structure of the menu item table with "entry_id" being "2".

FIG. 19 schematically illustrates a menu item table obtained by merging the menu item tables illustrated in FIG. 18A and FIG. 18B.

FIG. 20 is a schematic view illustrating a source code of the specification document in HTML format.

DESCRIPTION OF EMBODIMENTS

Prior to the description of an embodiment, what the inventor studied will be described.

Figure 1:
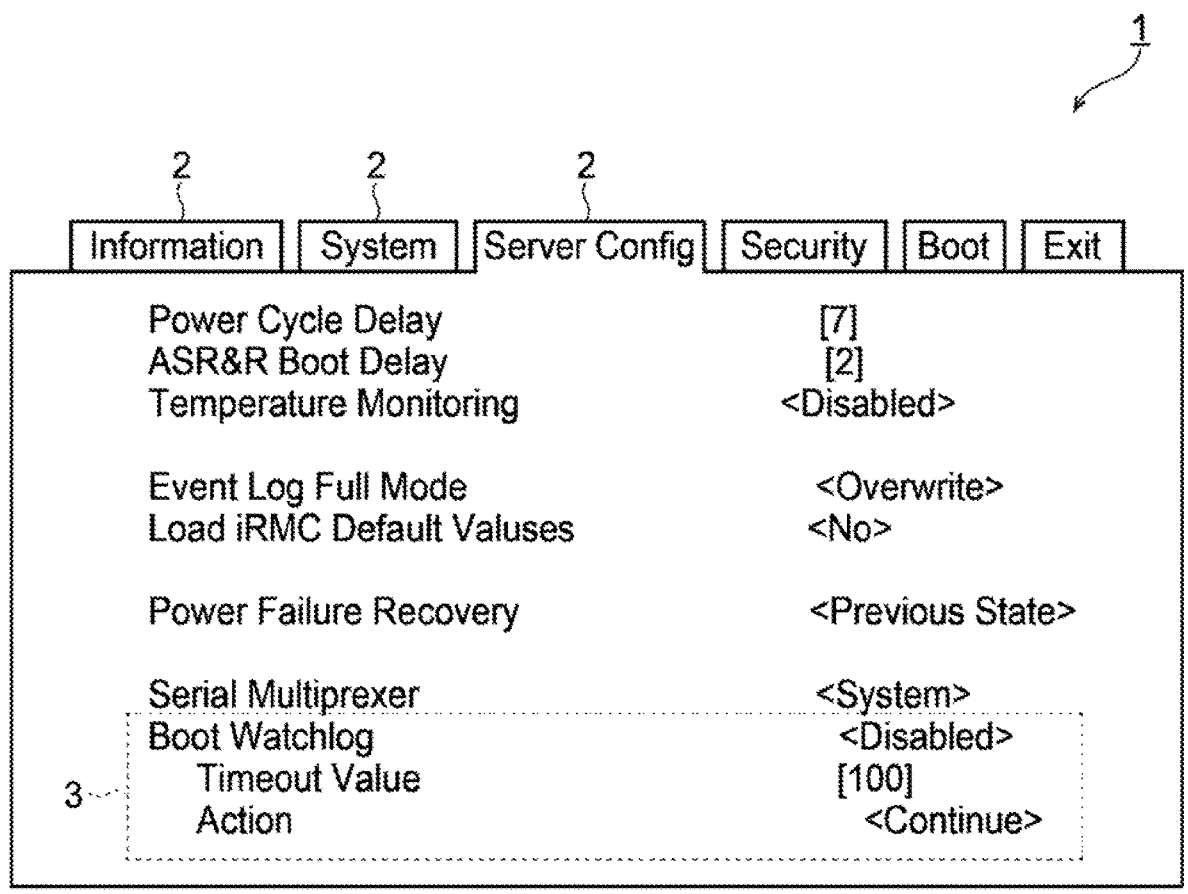
FIG. 1 illustrates a BIOS menu.

FIG. 1 illustrates a BIOS menu. A BIOS menu 1 is a menu-driven screen that the BIOS displays on a display device to allow the user to change the settings of the computer and the settings of the BIOS itself.

In the example of FIG. 1, the BIOS menu 1 has a plurality of pages 2 named "System", "Server Config", and other names. Each page 2 includes menu items 3 such as "Boot Watchlog". The menu item 3 is an item for configuring the settings of the computer and other settings.

For example, the options for the menu item 3, "Boot Watchlog", are <Enabled> and <Disabled> in the drop-down list. The options of other menu items 3, "Timeout Value" and "Action", can be changed only when <Enabled> is selected, and are grayed out and cannot be changed when <Disabled> is selected.

FIG. 2A schematically illustrates a specification document for the BIOS menu 1. A specification document 5 is an electronic file describing the specifications of the BIOS menu 1. For example, the specification document 5 includes a cover sheet 6 and a specification 7 of each page 2. A specification 9 of the menu item is described in the specification 7 of the page 2.

FIG. 2B schematically illustrates items included in the specification 7 of the page 2. As illustrated in FIG. 2B, the specification 7 of the page 2 includes the page name, the menu item name, and other various items.

FIG. 3 schematically illustrates the specification 9 of each of the menu items "Boot Watchlog" and "Timeout Value".

As illustrated in FIG. 3, these specifications 9 include selectable options, an operation privilege, a condition for display, a default value in each computer model, and a help message in addition to the menu item.

The specification documents 5 are classified into a primary specification document and a secondary specification document according to their use. The primary specification document is a specification document referenced by the developer who creates the BIOS. Meanwhile, the secondary specification document is a specification document referenced by a person in charge of testing a computer equipped with the BIOS or a person who creates the user manual of the computer.

The secondary specification document is given to the person in charge of the test before the test, and the test is conducted according to the contents of the secondary specification document. Therefore, when the display contents differ between the computer to be tested and the secondary specification document, the test ends in failure.

The secondary specification document is also given to the person who creates the user manual prior to release of the computer, and the user manual is created based on the contents of the secondary specification document. Therefore, to avoid user confusion, the BIOS menu 1 displayed by the computer is required to be displayed in accordance with the secondary specification document.

Now, a case in which a BIOS developer adds a BIOS menu that is not in the primary specification document or changes the BIOS menu that is in the primary specification document will be discussed. In this case, when the contents of the modification of the BIOS are reflected to the primary specification document and the primary specification document becomes the secondary specification document without any revision, the respective contents of the primary specification document and the secondary specification document become the same, and unnecessary confusion can be avoided.

For example, the person in charge identifies the contents of the modification by statically analyzing the source code of the BIOS, and reflects the contents of the modification to the secondary specification document. This makes the respective contents of the primary specification document and the secondary specification document the same.

However, display items that can be identified by statically analyzing the source code are limited to static display items that are determined independently of the hardware configuration of the computer. For example, in FIG. 1, "<Disabled>" in the menu item "Temperature Monitoring" for setting whether to monitor the temperature of the processor is an example of the static display item.

On the other hand, the BIOS menu also includes dynamic display items that are determined by the hardware configuration of the computer. The contents of the dynamic display items vary by the hardware configuration of the computer, and therefore, cannot be identified from the source code.

Figure 4:
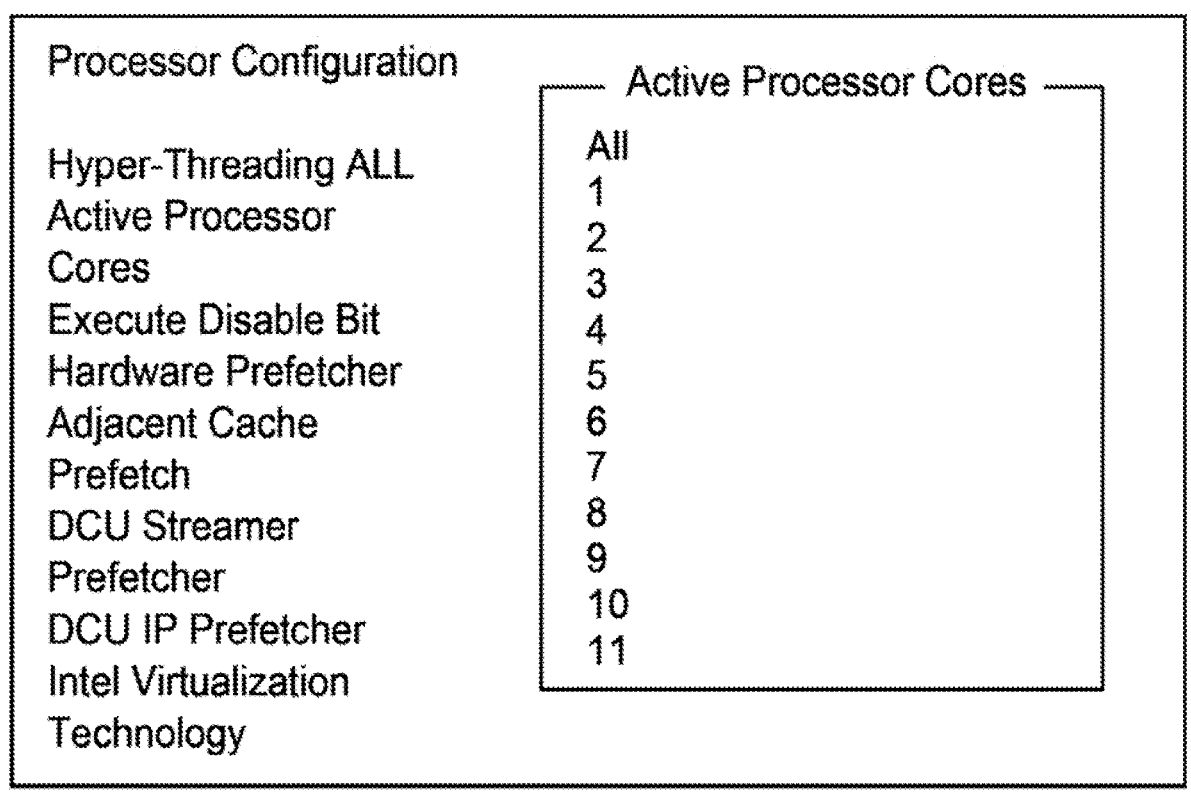
FIG. 4 is a schematic view of the BIOS menu for describing a dynamic display item of the BIOS.

FIG. 4 is a schematic view of the BIOS menu 1 for describing the dynamic display item of the BIOS.

In the example of FIG. 4, the menu item called "Active Processor Cores" is illustrated. This menu item is an item for selecting the number of usable cores of the CPU. In this example, "All", "1", "2", ..., "11" representing the number of cores are the dynamic display items. The number of cores varies by computer. Thus, the dynamic display items, such as "All", "1", "2", ..., "11", displayed in "Active Processor Cores" cannot be determined without actually displaying the BIOS menu 1 on the computer.

In addition, regardless of whether the display item is the dynamic display item or the static display item, the person in charge eventually needs to operate the computer in the manner described below to update the page 2 of the specification document.

Figure 5:
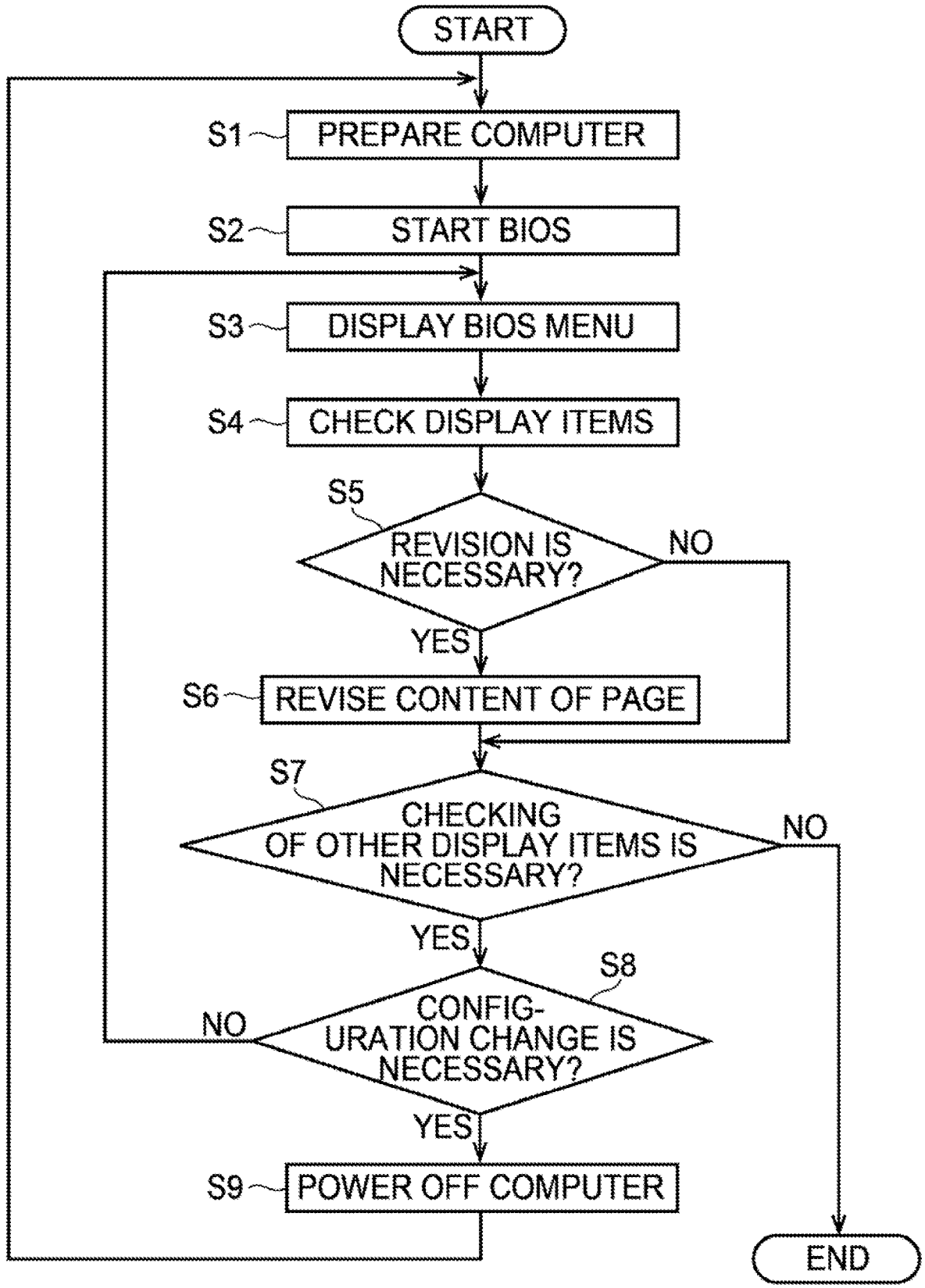
FIG. 5 is a flowchart of a process performed by a person in charge to update a page.

FIG. 5 is a flowchart of a process performed by the person in charge to update the page 2. First, the person in charge prepares a computer on which the dynamic display items are to be displayed (step S1).

Then, the person in charge powers on the computer to start the BIOS (step S2).

Then, the person in charge causes the BIOS menu 1 to be displayed (step S3).

The person in charge then checks the display items in the BIOS menu 1 (step S4).

The person in charge compares the display items that are displayed with the corresponding page 2 of the specification document, and determines whether it is necessary to revise the contents of the page 2 (step S5).

When it is determined that revision is necessary, the process proceeds to step S6, and the person in charge revises the contents of the page 2. When the determination in step S5 is NO, step S6 is skipped.

Then, the person in charge determines whether it is necessary to check other display items (step S7). When it is determined that check is not necessary, the process ends.

On the other hand, when the determination in step S7 is YES, the process proceeds to step S8. In step S8, the person in charge determines whether it is necessary to change the hardware configuration such as the number of cores of the CPU. For example, to check the display items in the menu item "Active Processor Cores" as illustrated in FIG. 4, it is necessary to change the number of cores of the CPU.

When it is determined that changing of the configuration is not necessary in step S8, the process returns to step S3. On the other hand, when the determination in step S8 is YES, the process proceeds to step S9, and the person in charge powers off the computer. Thereafter, the process returns to step S1, and a computer with a hardware configuration that has been changed is prepared.

In this manner, the process performed by the person in charge to update the page 2 is completed. This method requires preparation of a computer having a hardware configuration corresponding to the page 2 of the specification document, taking a long time to create the specification document.

In particular, since the dynamic display items cannot be identified from the source code of the BIOS as described above, it takes a long time when the page 2 corresponding to the dynamic display item is updated.

Moreover, the person in charge manually revises the specification document, which may result in errors in the specification document. In such cases, the specification document is required to be re-created, and the time and the cost are wasted.

Embodiment

Figure 6:
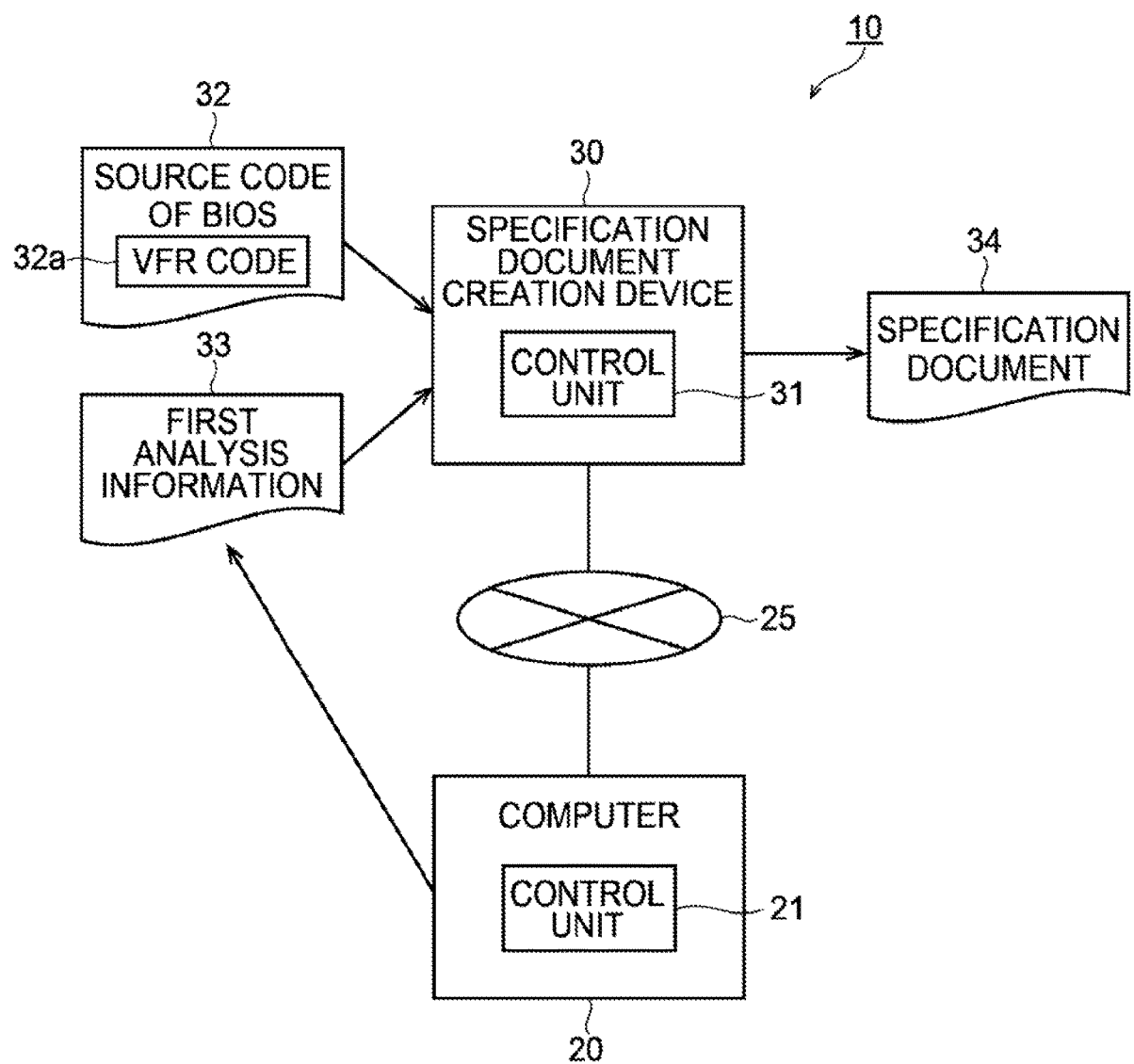
FIG. 6 is a system configuration diagram of a specification document creation system in accordance with an embodiment.

FIG. 6 is a system configuration diagram of a specification document creation system 10 in accordance with an embodiment.

As illustrated in FIG. 6, the specification document creation system 10 includes a computer 20 and a specification document creation device 30. The computer 20 and the specification document creation device 30 are interconnected through a network 25 such as the Internet, a local area network (LAN), or other networks. When the person in charge exchanges data between the computer 20 and the specification document creation device 30 using a portable recording medium such as a universal serial bus (USB) memory, the network 25 is not necessary.

The computer 20 is a computer, such as a personal computer (PC), a server, or other computers, that executes a BIOS. In the present embodiment, a specification document 34 for the BIOS executed by the computer 20 is created. The computer 20 is an example of a first computer. The specification document 34 may be either the primary specification document or the secondary specification document.

The computer 20 also includes a control unit 21 for generating first analysis information 33 about the dynamic display item. The first analysis information 33 is required to create the specification document 34. The first analysis information 33 will be described later.

The specification document creation device 30 is a computer such as a server, a personal computer (PC), or other computers, and includes a control unit 31 that controls the components of the specification document creation device 30 and creates the specification document 34. The specification document creation device 30 is an example of a second computer.

In this example, the control unit 31 acquires a source code 32 of the BIOS and the first analysis information 33, and creates the specification document 34 for the BIOS menu on the basis of them. The source code 32 of the BIOS is the source code of the BIOS executed by the computer 20. The source code 32 includes a visual forms representation (VFR) code 32a described in the unified extensible firmware interface (UEFI) specification.

FIG. 7 schematically illustrates the VFR code 32a. As illustrated in FIG. 7, various elements are contained in the VFR code 32a. The "formset" element is an element indicating the start of the VFR code 32a. The "guid" element is an element that uniquely identifies the page 2 (see FIG. 1) of the BIOS menu 1. The "goto" element is an element indicating the page 2 to be transitioned to next. The "label" element indicates the location to which the dynamic display item is inserted.

In the VFR code 32a, directives "#if" and "#endif" of the C language are written. These directives are directives that instruct the computer 20 not to compile a part 32b of the source code 32 when the computer 20 is a particular model. In this example, when the model of the computer is "MODEL_A" or "MODEL_C", the part 32b sandwiched between the directive "#if" and the directive "#endif" is compiled. When the model of the computer is "MODEL_B", the part 32b is not compiled.

Figure 8:
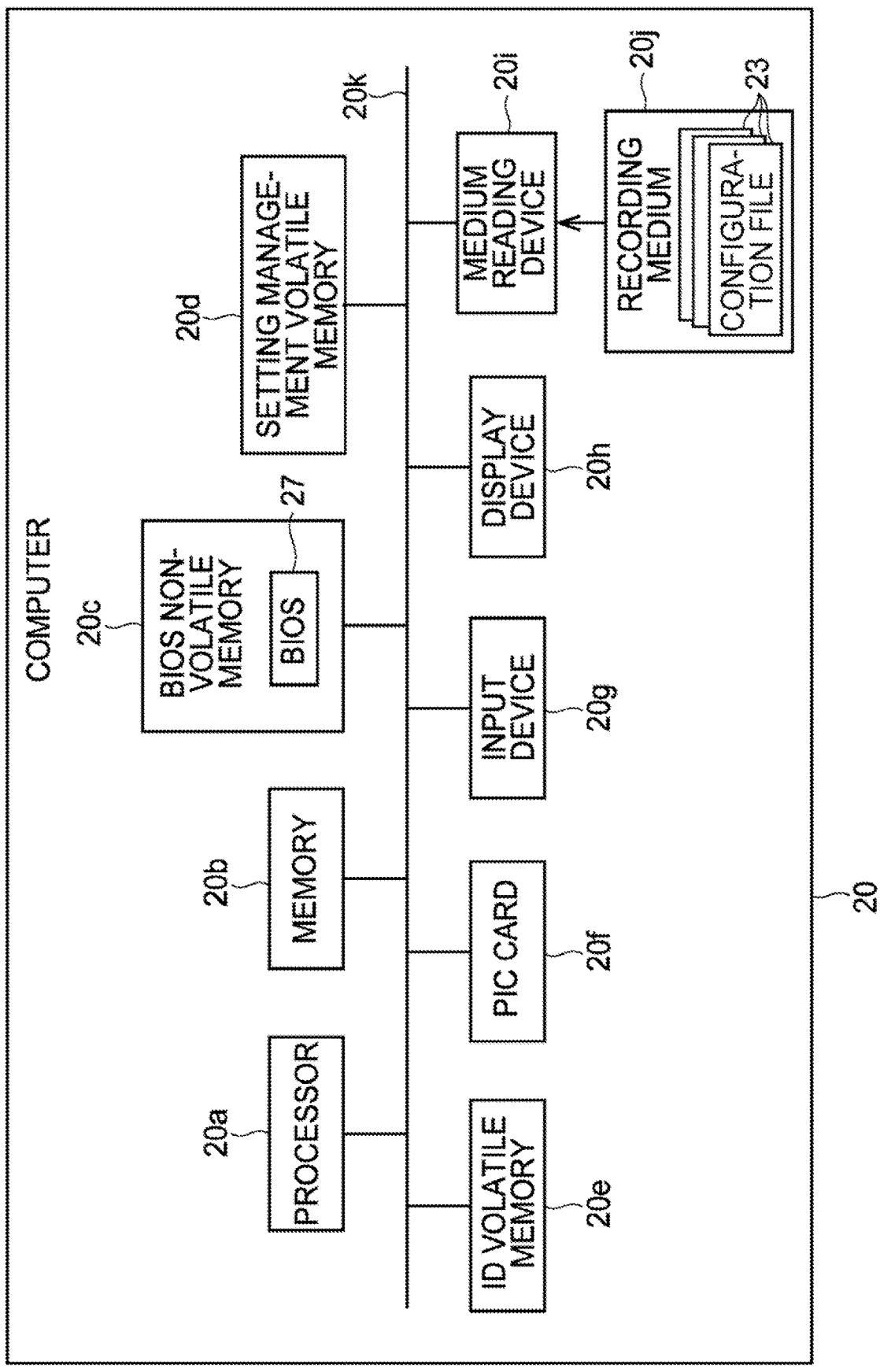
FIG. 8 is a hardware configuration diagram of a computer.

FIG. 8 is a hardware configuration diagram of the computer 20. As illustrated in FIG. 8, the computer 20 includes a processor 20a, a memory 20b, a BIOS nonvolatile memory 20c, a setting management nonvolatile memory 20d, and an ID nonvolatile memory 20e. The computer 20 further includes a peripheral component interconnect (PCI) card 20f, an input device 20g, a display device 20h, and a medium reading device 20i. These components are interconnected through a bus 20k.

The processor 20a is a CPU or a graphics processing unit (GPU) that controls the components of the computer 20 and executes various programs. The memory 20b is a volatile memory such as a dynamic random access (DRAM) or the like, and various programs to be executed by the processor 20a are loaded into the memory 20b.

The BIOS nonvolatile memory 20c is a nonvolatile memory that stores a BIOS program 27. The BIOS program 27 is a binary file obtained by compiling the source code 32 of the BIOS.

The setting management nonvolatile memory 20d is a nonvolatile memory that stores the settings set through the BIOS menu. The ID nonvolatile memory 20e is a nonvolatile memory that stores an ID that is a string of characters representing the model of the computer 20.

The PCI card 20f is a communication interface for communicating with external devices using a PCI bus. The input device 20g is a device such as a keyboard and a mouse for allowing the person in charge to input various types of information to the computer 20.

The display device 20h is hardware such as a liquid crystal display or the like that displays the BIOS menu. The medium reading device 20i is a device that writes and reads data to and from a portable recording medium 20j such as a USB memory or the like.

The recording medium 20j is a portable medium that stores configuration files 23. The configuration file 23 is a file containing configuration information indicating the hardware configuration of the computer 20. Examples of the hardware configuration include, but are not limited to, the number of cores of the processor 20a of the computer 20. In this example, the configuration files 23 contain different configuration information.

FIG. 9 schematically illustrates the configuration information contained in the configuration file 23. In the example of FIG. 9, configuration information 24 is expressed in extensible markup language (XML) format. For example, the tag <cpu_cores> indicates the number of cores of one processor 20a, and the tag <memory_size> indicates the size of the memory 20b.

Figure 10:
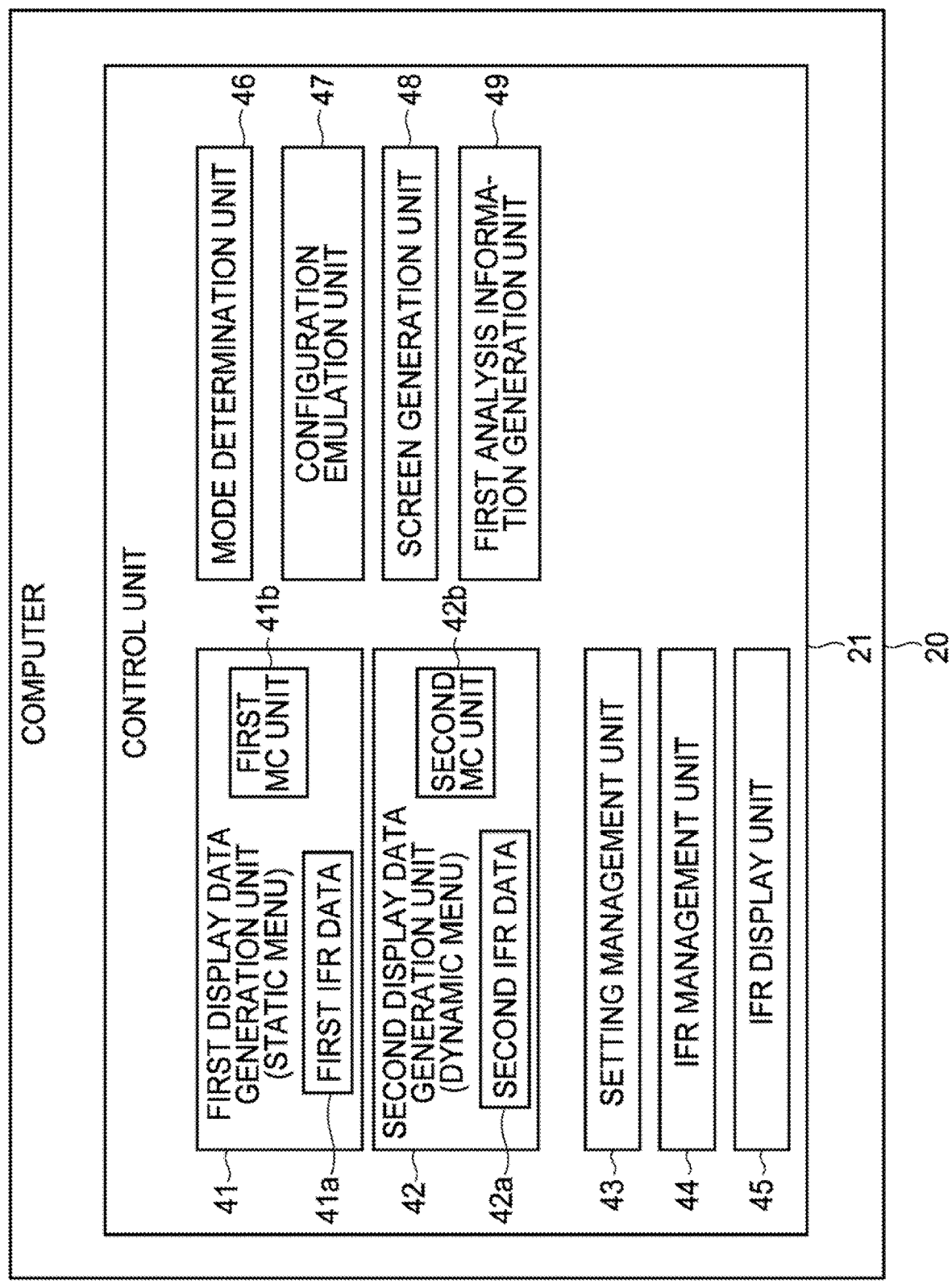
FIG. 10 is a functional block diagram of the computer.

FIG. 10 is a functional block diagram of the computer 20. As illustrated in FIG. 10, the control unit 21 of the computer 20 includes a first display data generation unit 41, a second display data generation unit 42, a setting management unit 43, an internal forms representation (IFR) management unit 44, and an IFR display unit 45. The control unit 21 further includes a mode determination unit 46, a configuration emulation unit 47, a screen generation unit 48, and a first analysis information generation unit 49. Such functions of the control unit 21 are implemented by the processor 20a and the memory 20b executing the BIOS program 27.

The mode determination unit 46 is a processing unit that determines whether the computer 20 is in a dynamic display item analysis mode. The dynamic display item analysis mode is a mode in which the computer 20 generates the first analysis information 33 including the dynamic display items of the BIOS. For example, the mode determination unit 46 determines that the computer 20 is in the dynamic display item analysis mode when the name of the configuration file 23 is a particular name determined in advance.

The mode determination unit 46 may determine that the computer 20 is in the dynamic display item analysis mode when the dual inline package (DIP) switch on the motherboard of the computer 20 indicates a value.

The first display data generation unit 41 is a processing unit that generates first internal forms representation (IFR) data 41a for displaying the static display items on the display device 20h. The first IFR data 41a is data according to the UEFI specification, obtained by compiling the code corresponding to the static display items in the VFR code 32a of the source code 32.

The first display data generation unit 41 includes a first menu controller (MC) unit 41b. The first MC unit 41b is a processing unit that generates the first IFR data 41a when the computer 20 is in the dynamic display item analysis mode, and passes the generated first IFR data 41a to the IFR management unit 44.

Here, the first MC unit 41b does not refer to the hardware configuration such as the actual number of cores of the processor 20a of the computer 20 and the like. Instead, the first MC unit 41b acquires the configuration information 24 contained in the configuration file 23 stored in the recording medium 20j through the configuration emulation unit 47, and refers to the acquired configuration information 24 to generate the first IFR data 41a.

In the case that the configuration emulation unit 47 does not pass the configuration information 24, the first MC unit 41b refers to the actual hardware configuration of the computer 20 to generate the first IFR data 41a.

The second display data generation unit 42 is a processing unit that generates the second IFR data 42a for displaying the dynamic display items on the display device 20h. The second IFR data 42a is an example of display data, and is data according to the UEFI specification, obtained by compiling the code corresponding to the dynamic display items in the VFR code 32a of the source code 32.

The second display data generation unit 42 includes a second MC unit 42b. The second MC unit 42b is a processing unit that generates the second IFR data 42a when the computer 20 is in the dynamic display item analysis mode, and passes the generated second IFR data 42a to the IFR management unit 44.

The dynamic display item displayed according to the second IFR data 42a is an example of a first display item. In this example, the second MC unit 42b does not refer to the hardware configuration such as the actual number of cores of the processor 20a of the computer 20 and the like. Instead, the second MC unit 42b acquires the configuration information 24 contained in the configuration file 23 stored in the recording medium 20j through the configuration emulation unit 47, and refers to the acquired configuration information 24 to generate the second IFR data 42a.

Therefore, without changing the hardware configuration of the computer 20, the second IFR data 42a for each of the computers 20 with different hardware configurations can be generated.

In the case that the configuration emulation unit 47 does not pass the configuration information 24, the second MC unit 42b refers to the actual hardware configuration of the computer 20 to generate the second IFR data 42a.

The configuration emulation unit 47 passes the configuration information 24 contained in the configuration file 23 stored in the recording medium 20j to each of the display data generation units 41 and 42 when acquisition requests of the configuration information 24 are transmitted from the display data generation units 41 and 42. For example, a case in which the second display data generation unit 42 requests the configuration emulation unit 47 to acquire the number of cores of the processor 20a is discussed. In this case, the configuration emulation unit 47 passes the number of cores described in the configuration file 23 to the second display data generation unit 42. The number of cores that is passed to the second display data generation unit 42 may be different from the actual number of cores of the processor 20a. The second display data generation unit 42 generates the second IFR data 42a based on this number of cores.

The screen generation unit 48 is a processing unit that acquires the IFR data 41a and 42a from the IFR management unit 44, and simulatively generates a display screen of the BIOS menu 1 on the basis of the acquired IFR data 41a and 42a. The screen generation unit 48 does not actually display the screen on the display device 20h, but only generates the data required to display the screen. The screen generation unit 48 passes the IFR data 41a and 42a that have been used to display the screen, to the first analysis information generation unit 49.

The page structure of the display screen of the BIOS menu 1 is often in the form of a tree. Therefore, the screen generation unit 48 may extract the IFR data 41a and 42a of all the pages using an algorithm that breadth-first searches the tree-shaped data structure, or the like, and passes the extracted IFR data 41a and 42a to the first analysis information generation unit 49. The IFR data 41a and 42a have information called Cross-Reference, which is used to display other pages. This information shows the transition relationship between pages.

The setting management unit 43 is a processing unit that manages the setting information indicating the setting that has been changed in the BIOS menu 1, and writes the setting information to the setting management nonvolatile memory 20d. The setting management unit 43 receives the setting information from the IFR display unit 45.

The IFR management unit 44 is a processing unit that acquires the IFR data 41a and the IFR data 42a from the first display data generation unit 41 and the second display data generation unit 42, respectively, and manages the obtained IFR data 41a and 42a as a database. The IFR management unit 44 passes the IFR data 41a and 42a to the IFR display unit 45 when receiving acquisition requests of the IFR data 41a and 42a from the IFR display unit 45.

The IFR display unit 45 is a processing unit that displays the BIOS menu 1 on the display device 20h by analyzing the IFR data 41a and 42a. The IFR display unit 45 changes the display of the BIOS menu 1 according to the input from the input device 20g. When the setting of the BIOS menu 1 is changed, the IFR display unit 45 notifies the setting management unit 43 of the information about the setting that has been changed.

The first analysis information generation unit 49 is a processing unit that generates the first analysis information obtained by analyzing the IFR data 41a and 42a acquired from the screen generation unit 48. The first analysis information is an example of first information, and includes the dynamic display item included in the second IFR data 42a.

FIG. 11 schematically illustrates the first analysis information 33. In the example of FIG. 11, the first analysis information 33 is expressed in XML format. The first analysis information 33 and the VFR code 32a in FIG. 7 correspond in the following manner.

For example, the "menu_page" element of the first analysis information 33 indicates the structure of the page 2, and corresponds to the information of "formset" of the VFR code 32a. In addition, the "formsetguid" element corresponds to the information of "guid" of "formset" of the VFR code 32a. The "item" elemenet indicates the menu item, and corresponds to items expressed by "oneof" to "endoneof" of the VFR code 32a.

The "next_page" element is information connecting the pages 2, and indicates the page 2 to be transitioned to. The "next_page" element corresponds to the information expressed under "goto" of the VFR code 32a.

The "dynamic_item" element indicates the location to which the dynamic display item is to be inserted, and corresponds to the information expressed by "label" of the VFR code 32a.

The "suppress_condition" element indicates the condition for not displaying the contents of the item, and corresponds to the directives "#if" to "#endif" of the VFR code 32a. In this example, the condition that the model of the computer 20 is "MODEL_B" is written in the "suppress_condition" element. The "xsd:string" element next to the "suppress_condition" element is a dynamic display item 33a that is not displayed in the BIOS menu 1 when the model is "MODEL_B". The dynamic display item 33a is an example of the first display item.

Although not illustrated in the VFR code 32a in FIG. 7, the first analysis information 33 also includes the "grayout_condition" element. The "grayout_condition" element corresponds to the condition for graying out the display item.

The IFR data 41a and 42a are expressed in equations that can be evaluated using a stack-based evaluator, and the IFR display unit 45 simply evaluates the equations and displays what to be displayed. On the other hand, the equation EFI_IFR_SUPPRESS_IF may become true as a result of the evaluation of the IFR data 41a and 42a by the first analysis information generation unit 49. This is a result that the dynamic display item 33a is not displayed, but even in this case, the first analysis information generation unit 49 generates the dynamic display item 33a in the first analysis information 33.

Figure 12:
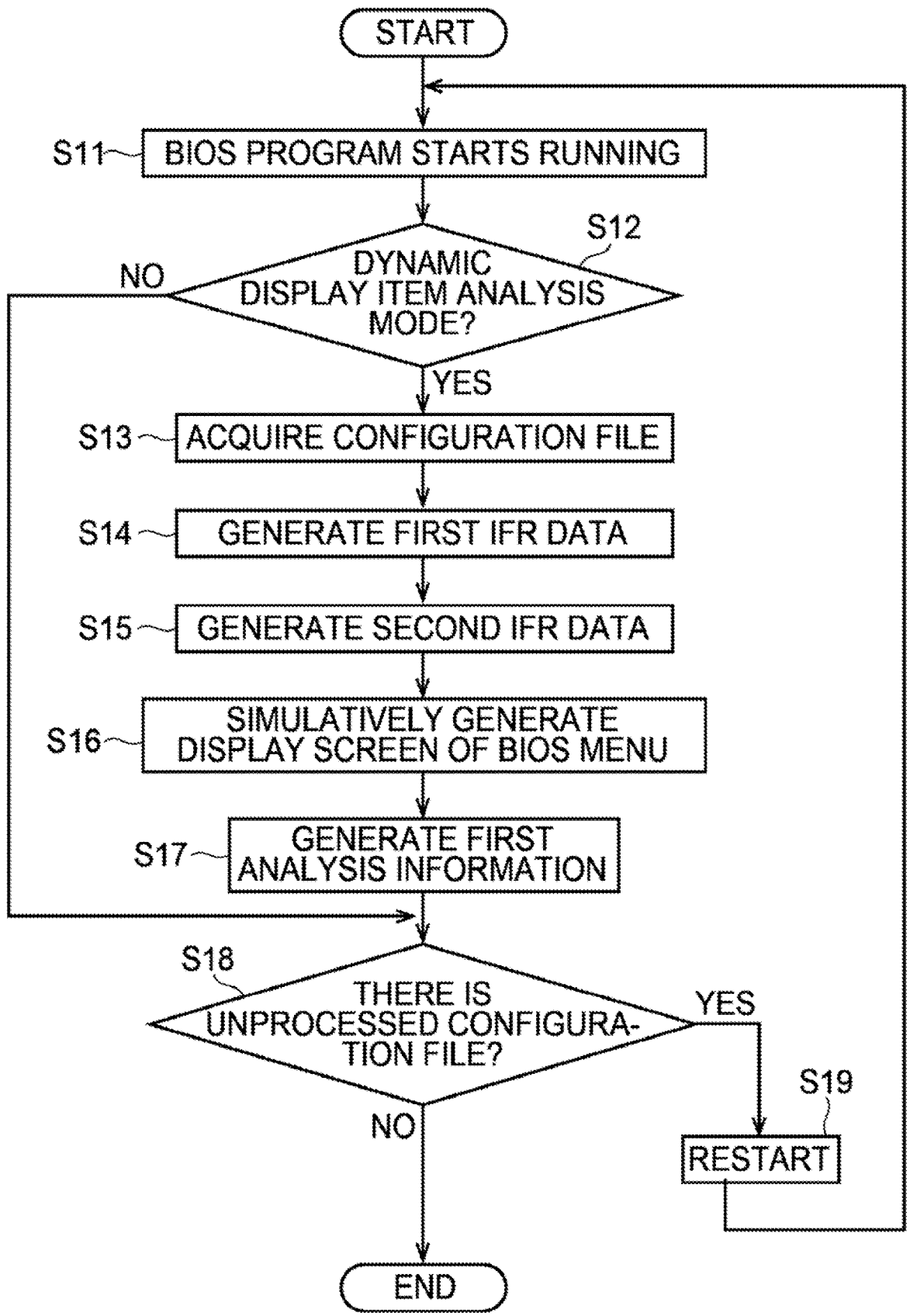
FIG. 12 is a flowchart of an analysis method in accordance with the embodiment.

Next, an analysis method executed by the computer 20 will be described. FIG. 12 is a flowchart of an analysis method in accordance with the present embodiment.

When the computer 20 is powered on, the BIOS program 27 starts running (step S11).

Then, the mode determination unit 46 determines whether the computer 20 is in the dynamic display item analysis mode (step S12). For example, the mode determination unit 46 determines that the computer 20 is in the dynamic display item analysis mode when an unprocessed configuration file 23 that has not been acquired exists in the recording medium 20j and the name of the unprocessed configuration file 23 is a particular name determined in advance.

When the determination in step S12 is YES, the process proceeds to step S13. In step S13, the configuration emulation unit 47 acquires one of the configuration files 23 from the recording medium 20j.

Then, the first display data generation unit 41 generates the first IFR data 41a for displaying the static display items, on the basis of the configuration information 24 in the configuration file 23, and passes the generated first IFR data 41a to the IFR management unit 44 (step S14).

Then, the second MC unit 42b of the second display data generation unit 42 generates the second IFR data 42a for displaying the dynamic display item, on the basis of the configuration information 24, and passes the generated second IFR data 42a to the IFR management unit 44 (step S15).

Then, the screen generation unit 48 acquires the IFR data 41a and 42a from the management unit 44, and simulatively generates the display screen of the BIOS menu 1 (step S16). Furthermore, the screen generation unit 48 passes the IFR data 41a and 42a to the first analysis information generation unit 49.

Then, the first analysis information generation unit 49 analyzes the IFR data 41a and 42a to generate the first analysis information 33 indicating the analysis results, and stores the first analysis information 33 in the recording medium 20j (step S17).

Then, the mode determination unit 46 determines whether an unprocessed configuration file 23, which is not acquired yet, exists in the recording medium 20j (step S18). Step S18 is also executed when the determination in step S12 is NO.

When the determination in step S18 is YES, the process proceeds to step S19, and the first analysis information generation unit 49 restarts the computer 20. Thereafter, the process returns to step S11 again. On the other hand, when the determination in step S18 is NO, the process ends.

In the analysis method described above, the second display data generation unit 42 generates the second IFR data 42a on the basis of the configuration information 24 (step S15). Then, the first analysis information generation unit 49 generates the first analysis information 33 on the basis of the second IFR data 42a (step S17). Thus, even when the person in charge does not prepare computers with different hardware configurations, the first analysis information 33 corresponding to each of the different configurations can be obtained by simply preparing a plurality of sets of the configuration information 24. Therefore, as described later, the specification document creation device 30 can create the specification document 34 on the basis of the first analysis information 33 in a short time.

Figure 13:
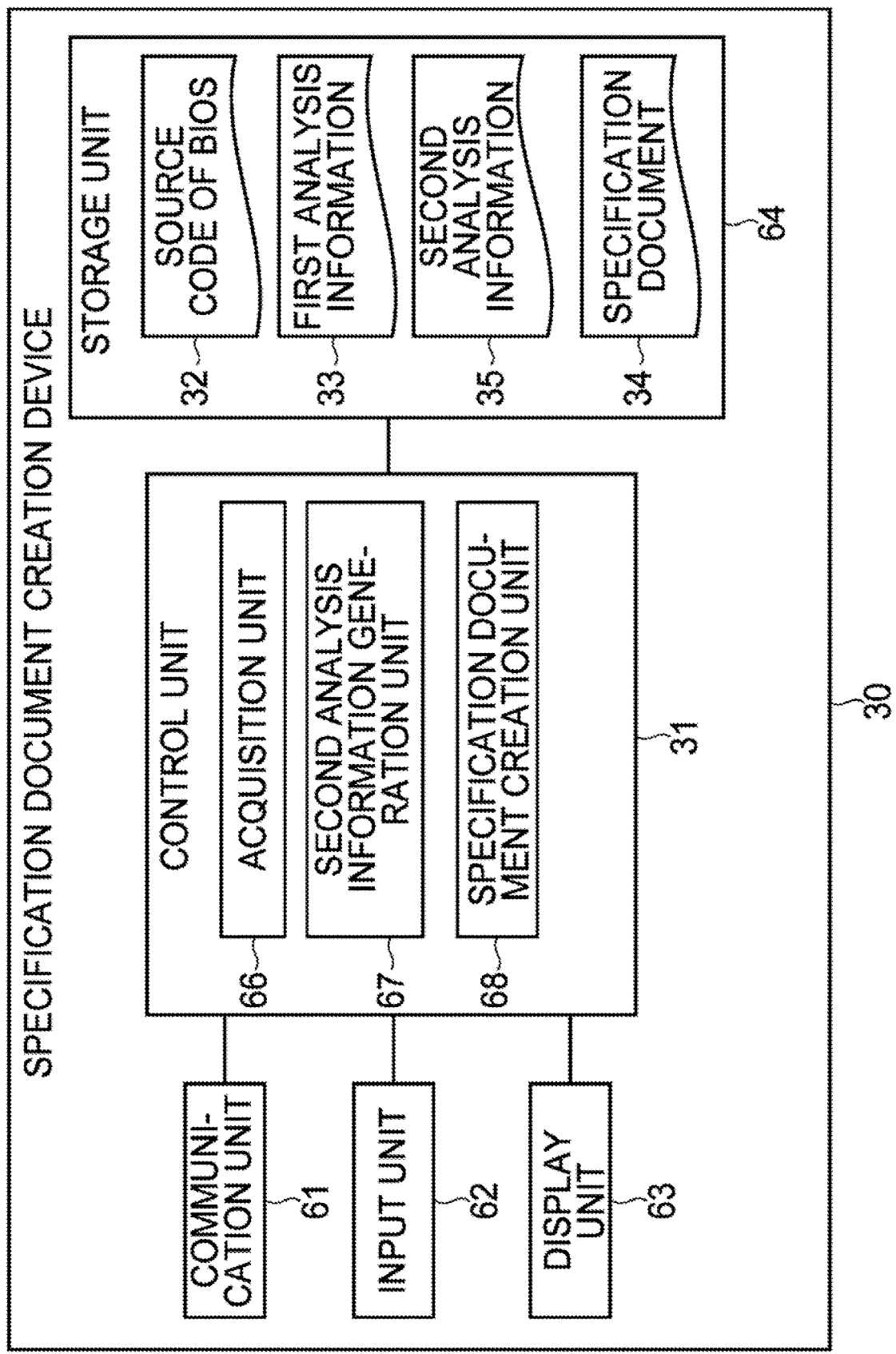
FIG. 13 is a functional block diagram of a specification document creation device.

Next, the functional configuration of the specification document creation device 30 (see FIG. 6) will be described. FIG. 13 is a functional block diagram of the specification document creation device 30.

As illustrated in FIG. 13, the specification document creation device 30 includes the control unit 31, a communication unit 61, an input unit 62, a display unit 63, and a storage unit 64.

The communication unit 61 is a processing unit that connects the specification document creation device 30 to the network 25. The input unit 62 is a processing unit that allows the person in charge to input various commands to the specification document creation device 30. The display unit 63 is a processing unit for displaying the generated specification document 34 and the like.

The storage unit 64 stores the source code 32 of the BIOS, the first analysis information 33, the specification document 34, and second analysis information 35. The second analysis information 35 will be described later.

The control unit 31 is a processing unit that controls each unit of the specification document creation device 30. As an example, the control unit 31 includes an acquisition unit 66, a second analysis information generation unit 67, and a specification document creation unit 68.

The acquisition unit 66 is a processing unit that acquires the source code 32 and the first analysis information 33 through the communication unit 61.

The second analysis information generation unit 67 is a processing unit that statically analyzes the source code 32. Furthermore, the second analysis information generation unit 67 generates the second analysis information 35 including the static display items, which can be determined independently of the hardware configuration of the computer 20, of the BIOS on the basis of the analysis results, and stores the generated second analysis information 35 in the storage unit 64.

FIG. 14 schematically illustrates the second analysis information 35. The second analysis information 35 is an example of second information, and is written in the same XML format as the first analysis information 33 in FIG. 11. In the first analysis information 33, the "xsd:string" element next to the "item_name" element is a static display item 35a that is displayed in the BIOS menu 1 independently of the hardware configuration of the computer 20. The static display item 35a is an example of a second display item.

The second analysis information generation unit 67 generates such second analysis information 35 by analyzing the VFR code 32a included in the source code 32.

Referring back to FIG. 13, the description will be continued. The specification document creation unit 68 is a processing unit that creates the specification document 34 for the BIOS in which the dynamic display items 33a included in the first analysis information 33 and the static display items 35a included in the second analysis information 35 are described.

FIG. 15 schematically illustrates the specification document 34 created by the specification document creation unit 68. In FIG. 15, the specification of the menu item "Active Processor Cores" is illustrated. The format of the specification document 34 is not particularly limited, but in this example, the specification document creation unit 68 describes the specification document 34 in an HTML document. The dynamic display items 33a and the static display items 35a are described in the specification document 34.

For example, the dynamic display items 33a are strings of characters such as "All", "1", "2", . . . , "11" representing the number of usable cores of the CPU. The static display item 35a is a string of characters "Select number of active cores" representing the help for the menu item "Active Processor Cores.

In this example, the specification document creation unit 68 identifies that the "option value" representing the number of cores of the CPU is "2" and "3" on the basis of the configuration information 24 with "cpu_type" being "typeA". The specification document creation unit 68 also identifies that the "option value" representing the number of cores of the CPU is "2" on the basis of the configuration information 24 with "cpu_type" being "typeB".

Accordingly, when "cpu_type" is "typeA" or "typeB", "2" can be set in the "option value". When "cpu_type" is "typeA", "3" can be set in the "option value".

The specification document creation unit 68 describes hardware configurations indicated by respective sets of the configuration information 24 different from each other in association with the dynamic display items 33a corresponding to the respective hardware configurations in the specification document 34.

This allows the person in charge to know the dynamic display items 33a in each hardware configuration.

The "suppress condition" section in the specification document 34 is a section that specifies a model in which the contents of the dynamic display items 33a or the static display items 35a are not to be displayed. In this example, when the model of the computer 20 is "MODEL_B", the contents of the dynamic display items 33a or the static display items 35a are not to be displayed. These contents correspond to the contents written in the part 32b sandwiched between the directives "#if" and "#endif" in the VFR code 32a (see FIG. 7) of the source code 32 of the BIOS.

By describing such a "suppress condition" section in the specification document 34, the person in charge can know the contents not to be displayed depending on the model.

Figure 16:
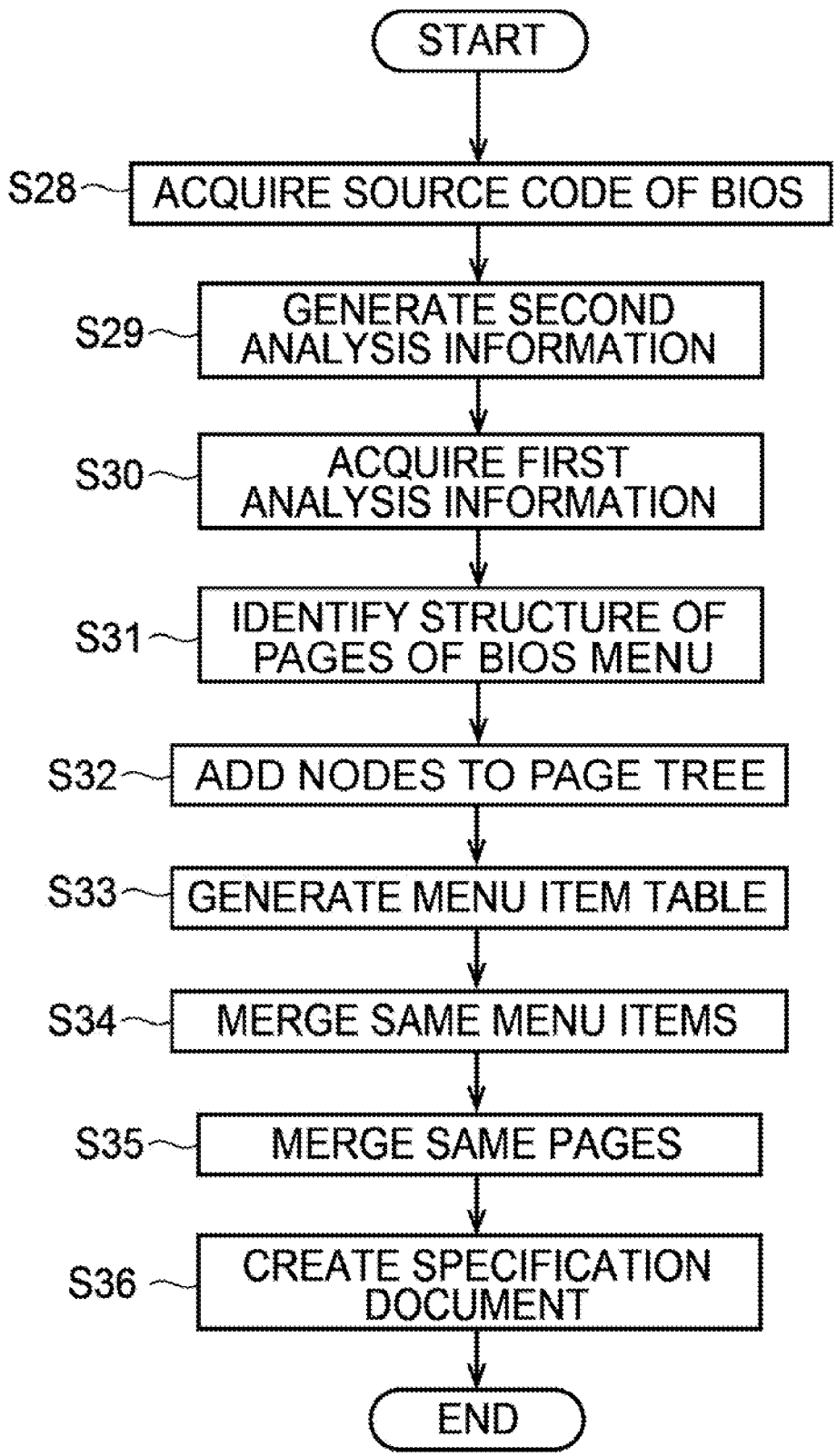
FIG. 16 is a flowchart of a specification document creation method in accordance with the embodiment.

FIG. 16 is a flowchart of a specification document creation method in accordance with the present embodiment. First, the acquisition unit 66 acquires the source code 32 of the BIOS through the communication unit 61, and stores the source code 32 in the storage unit 64 (step S28).

Then, the second analysis information generation unit 67 generates the second analysis information 35 by analyzing the source code 32 of the BIOS, and stores the generated second analysis information 35 in the storage unit 64 (step S29).

As illustrated in FIG. 7, the directives "#if" and "#endif" may be written in the VFR code 32a of the source code 32. The directives "#if" and "#endif" are the directives indicating that the part 32b of the source code 32 is not compiled when the model of the computer 20 is "MODEL_B".

In this case, the second analysis information generation unit 67 identifies the contents written in the part 32b of the source code 32. Then, the specification document creation unit 68 describes, in the specification document, that the contents written in the part 32b are not to be displayed when the model of the computer 20 is "MODEL_B". As an example, the specification document creation unit 68 describes "MODEL_B" in the "suppress condition" section of the specification document 34 (see FIG. 15).

Then, the acquisition unit 66 acquires the first analysis information 33 generated by the computer 20, and stores the acquired first analysis information 33 in the storage unit 64 (step S30).

Then, the specification document creation unit 68 analyzes the second analysis information 35 to identify the structure of the pages 2 of the BIOS menu 1 (step S31).

Figure 17:
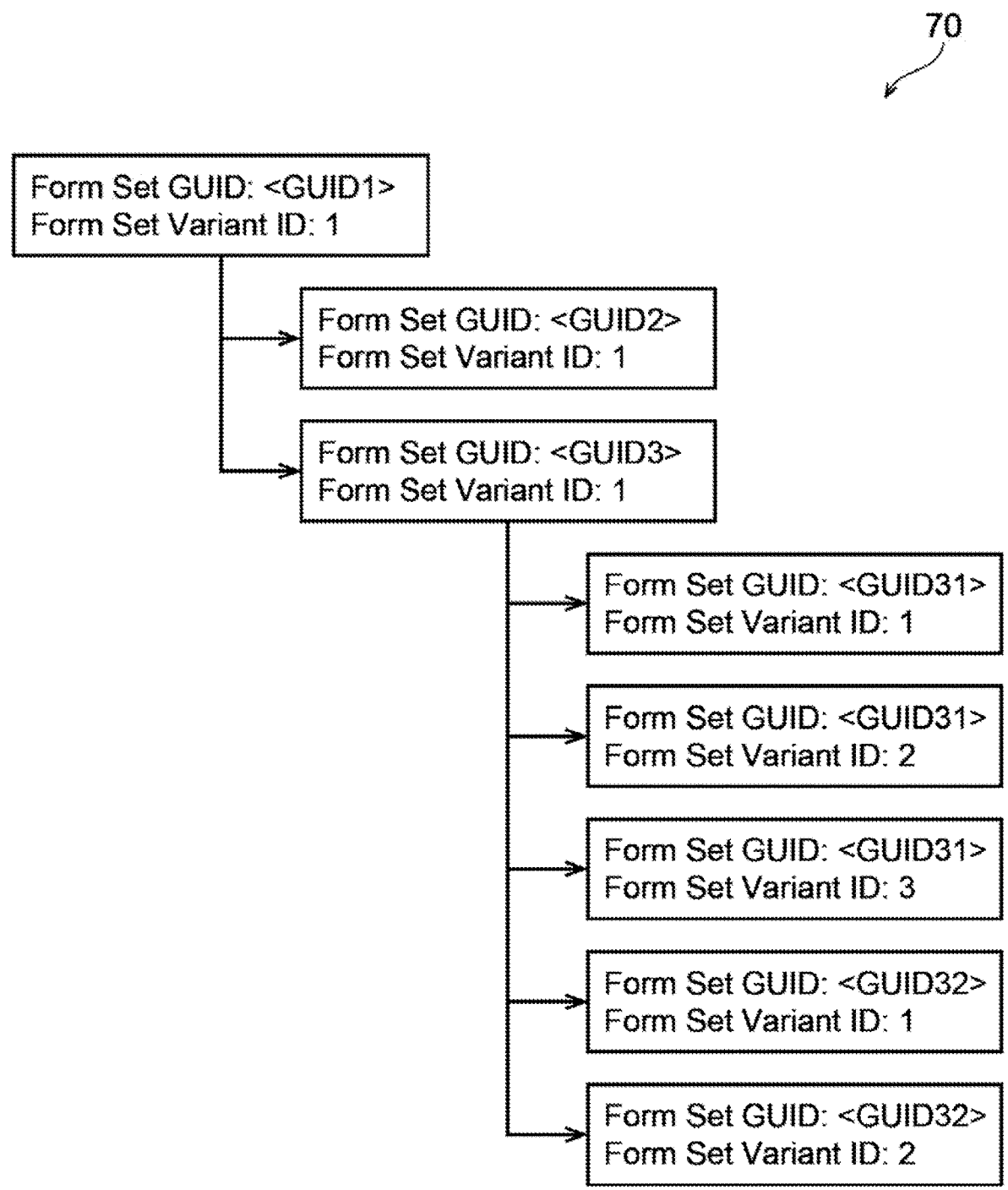
FIG. 17 is a schematic view illustrating the process in step S31 in FIG. 16.

FIG. 17 is a schematic view illustrating the process in step S31. As illustrated in FIG. 17, the specification document creation unit 68 generates a page tree 70 representing the structure of the pages 2 on the basis of the second analysis information 35. Each node in the page tree 70 corresponds to the "formsetguid" element included in the second analysis information 35, and the values of the "formsetguid" element are stored in <GUID1>, <GUID2>, <GUID3>, . . . . The nodes having the same value of the "formsetguid" element indicate the same page 2.

In this example, each node represents the following page 2.
<GUID1>: Page 2 for "Root"
<GUID2>: Page 2 for "Information"
<GUID3>: Page 2 for "System"
<GUID31>: Page 2 for "Processor Configuration"
<GUID32>: Page 2 for "Memory Configuration"

Referring back to FIG. 16, the description will be continued.

Then, the specification document creation unit 68 identifies the pages 2 of the BIOS menu 1 included in the first analysis information 33, and adds the nodes representing the identified pages 2 to the page tree 70 in FIG. 17 (step S32). This causes each node of the page tree 70 to include the static display item 35a identified in the second analysis information 35 and the dynamic display item 33a in the first analysis information 33.

Then, the specification document creation unit 68 generates a menu item table with respect to each node of the page tree 70 (step S33).

FIG. 18A schematically illustrates a menu item table 71. The menu item table 71 is a table that relates the menu item of the BIOS menu 1, the dynamic display items 33a included in the menu item, and the static display items 35a included in the menu item to each other.

In this example, the menu item table 71 for the menu item having a name of "Active Processor Cores" is illustrated. In this case, since "option" indicating the number of selectable cores depends on the processor 20a of the computer 20, "option" is the dynamic display item 33a. "Config_condition" indicates that these dynamic display items 33a are to be displayed on the page 2 when the type of the processor 20a is "typeA". "Supress_condition" indicates that the dynamic display item 33a is not to be displayed when the model of the computer 20 is "MODEL_B".

"Item_help" indicating the help screen for the page 2 for the "Active Processor Cores" is determined independently of the hardware configuration of the computer 20, and therefore, is the static display item 35a.

"Entry_id" in the menu item table 71 indicates that the menu item table 71 corresponds to the configuration information 24 identified by "1". The specification document creation unit 68 generates the menu item table 71 with respect to each of sets of the configuration information 24 indicating different hardware configurations. The number of options to be displayed is stored in "num_of_oneof_option".

FIG. 18B illustrates the structure of the menu item table 71 with "entry_id" being "2".

This menu item table 71 is a table corresponding to the configuration information 24 for the type of the processor 20a being "typeB".

Referring back to FIG. 16, the description will be continued. Then, the specification document creation unit 68 identifies the menu item tables 71 having the same menu item name from among the menu item tables 71, and merges the same menu items in the identified menu item tables 71 (step S34). For example, the menu item names in the menu item tables 71 in FIG. 18A and FIG. 18B are the same, "Active Processor Cores", and thus are to be merged.

FIG. 19 schematically illustrates a menu item table 72 obtained by merging the menu item tables 71 in FIG. 18A and FIG. 18B.

As illustrated in FIG. 19, the specification document creation unit 68 adds conditions 72a and 72b for displaying the dynamic display item 33a, to the menu item table 72. The condition 72a is a condition that "option" of "3" is displayed when the type of the processor 20a is "typeA". The condition 72b is a condition that "option" of "2" is displayed when the type of the processor 20a is "typeB".

"Entry_type" in the menu item table 72 in FIG. 19 is "marged_item", and "marged_item" indicates that the menu item table 72 is the item table after merging. Since "num_of_oneof_options" indicates the number of options to be displayed, the maximum value and the minimum value of "num_of_oneof_options" before merging are stored. Since "1" is recorded as "parent_entry_id" of the condition 72a and "child_entry_id=101" is stored in "config_condition" with "entry_id" being "1", the cross-reference is possible.

Referring back to FIG. 16, the description will be continued. The specification document creation unit 68 then merges the same pages in the same node in the page tree 70 (step S35). As an example, the specification document creation unit 68 merges the same pages indicated by the nodes of which the values of the "formsetguid" element indicated by <GUID1>, <GUID2>, <GUID3>, . . . in the page tree 70 are the same. At this time, the specification document creation unit 68 merges the same menu items in the same page in the same manner as in step S34.

At this time, as with the conditions 72a and 72b in FIG. 19, conditions for displaying the dynamic display item 33a may be added to the menu item table 72.

Thereafter, the specification document creation unit 68 generates the specification document 34 in HTML format in which the route node of the page tree 70 is set as a route element (step S36). FIG. 20 is a schematic view illustrating the source code of the specification document 34 in HTML format.

In the above described manner, the basic process of the specification document creation method in accordance with the present embodiment is completed. In the embodiment described above, the second analysis information generation unit 67 generates the second analysis information 35 by analyzing the source code 32 of the BIOS (step S29). Then, the specification document creation unit 68 creates the specification document 34 in which the static display items 35a included in the second analysis information 35 and the dynamic display items 33a included in the first analysis information 33 are described (step S36). As described above, the first analysis information 33 are automatically generated by the computer 20 on the bases of a plurality of sets of the configuration information 24 even when the person in charge does not prepare the computers 20 having different hardware configurations. Therefore, compared with the case in which the computers 20 having different hardware configurations are prepared, the specification document 34 can be created in a short time.

Furthermore, in this example, the specification document creation unit 68 automatically creates the specification document 34. Therefore, human error, which may occur when the person in charge creates the specification document 34 manually, does not occur, and therefore, the time and cost for correcting errors can be saved.

Moreover, in step S17 of FIG. 12, the computer 20 automatically generates the first analysis information 33 including the dynamic display items 33a, which cannot be identified from the source code 32 of the BIOS alone, from the configuration information 24. Therefore, the specification document creation device 30 can create the specification document 34 in which the dynamic display items 33a are described, on the basis of the generated first analysis information 33.

Hardware Configuration

Figure 21:
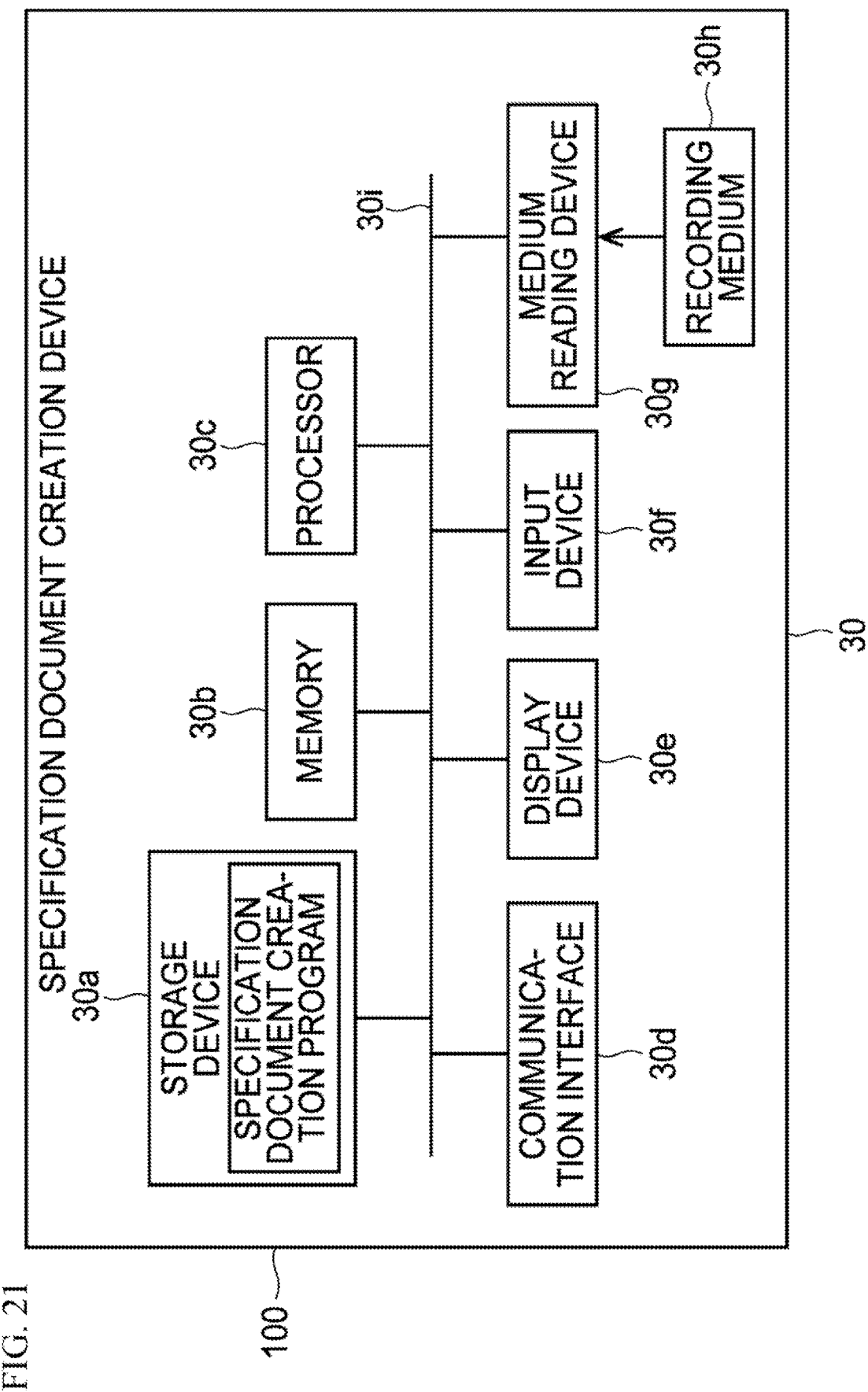
FIG. 21 is a hardware configuration diagram of the specification document creation device.

FIG. 21 is a hardware configuration diagram of the specification document creation device 30. As illustrated in FIG. 21, the specification document creation device 30 includes a storage device 30a, a memory 30b, a processor 30c, a communication interface 30d, a display device 30e, an input device 30f, and a medium reading device 30g. These components are interconnected via a bus 30i.

The storage device 30a is a non-volatile storage such as a hard disk drive (HDD) or a solid state drive, and stores a specification document creation program 100 in accordance with the present embodiment.

Alternatively, the specification document creation program 100 may be recorded in a computer-readable recording medium 30h, and the processor 30c may be made to read the specification document creation program 100 through the medium reading device 30g.

Such a recording medium 30h may be a physically portable recording medium such as a compact disc read only memory (CD-ROM), a digital versatile disc (DVD), or a universal serial bus (USB) memory, for example. Also, a semiconductor memory such as a flash memory, or a hard disk drive may be used as the recording medium 30h. Such a recording medium 30*h* is not a temporary medium such as carrier waves not having a physical form.

Further, the specification document creation program 100 may be stored in a device connected to a public line, the Internet, a LAN, or the like. In this case, the processor 30*c* reads and executes the specification document creation program 100.

The memory 30*b* is hardware that temporarily stores data like a dynamic random access memory (DRAM) or the like. The specification document creation program 100 is loaded into the memory 30*b*.

The processor 30*c* is hardware such as a CPU or a GPU that controls the components of the specification document creation device 30. The processor 30*c* and the memory 30*b* cooperate to execute the specification document creation program 100.

As the memory 30*b* and the processor 30*c* cooperate to execute the specification document creation program 100, the control unit 31 (see FIG. 13) of the specification document creation device 30 is implemented. The control unit 31 includes the acquisition unit 66, the second analysis information generation unit 67, and the specification document creation unit 68.

The storage unit 64 (see FIG. 13) is implemented by the storage device 30*a* and the memory 30*b*.

Furthermore, the communication interface 30*d* is hardware such as a network interface card (NIC) for connecting the specification document creation device 30 to the network 25. The communication unit 61 (see FIG. 13) is implemented by the communication interface 30*d*.

The display device 30*e* is hardware such as a liquid crystal display or a touch panel for displaying the specification document 34 in FIG. 15. The display unit 63 (see FIG. 13) is implemented by the display device 30*e*.

The input device 30*f* is hardware such as a keyboard and a mouse for allowing the person in charge to input various types of data to the specification document creation device 30. The input unit 62 (see FIG. 13) is implemented by the input device 30*f*.

The medium reading device 30*g* is hardware such as a CD drive, a DVD drive, and a USB interface for reading the recording medium 30*h*.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A specification document creation system including a first computer and a second computer, wherein:
    the first computer is configured to:
        generate, based on configuration information, display data for displaying a first display item, which is determined by the configuration information, of a BIOS on a display device, the configuration information indicating a hardware configuration of the first computer, and
        analyze the display data to generate first information including the first display item included in the display data, and
    the second computer is configured to:
        analyze a source code of the BIOS to generate second information including a second display item, which is determined independently of the hardware configuration of the first computer, of the BIOS, and
        create a specification document for the BIOS in which the first display item included in the first information and the second display item included in the second information are described, and wherein the source code of the BIOS is compiled corresponding to the first and the second display items described in the specification document.

2. A non-transitory computer-readable recording medium storing a specification document creation program that causes a first computer to execute a process, the process comprising;
    generating, based on configuration information, display data for displaying a first display item, the configuration information indicating a hardware configuration of the first computer;
    acquiring first information including a first display item, which is determined by a hardware configuration of a second computer, of a BIOS by analyzing the display data;
    analyzing a source code of the BIOS to generate second information including a second display item, which is determined independently of the hardware configuration of the first computer, of the BIOS, and
    creating a specification document for the BIOS in which the first display item included in the first information and the second display item included in the second information are described and
    compiling the source code of the BIOS corresponding to the first and the second display items described in the specification document.

3. The non-transitory computer-readable recording medium according to claim 2, wherein the process further comprises:
    identifying a directive that instructs not to compile a part of the source code when the first computer is a particular model, and
    describing, in the specification document, that a content written in the part is not to be displayed when the first computer is the particular model.

4. The non-transitory computer-readable recording medium according to claim 2, wherein the process further comprises describing hardware configurations different from each other in association with the second display items corresponding to the respective hardware configurations, in the specification document.

* * * * *